Figure 7:
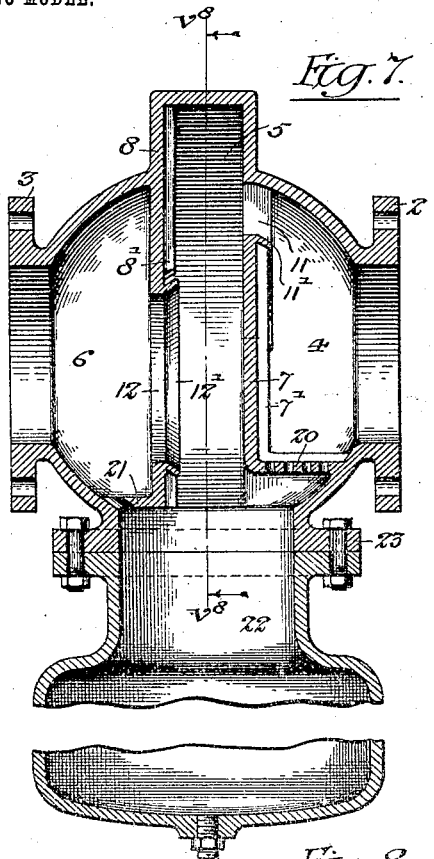

No. 773,830. PATENTED NOV. 1, 1904.
F. F. VATER.
SEPARATOR.
APPLICATION FILED FEB. 29, 1904.
NO MODEL. 3 SHEETS—SHEET 1.
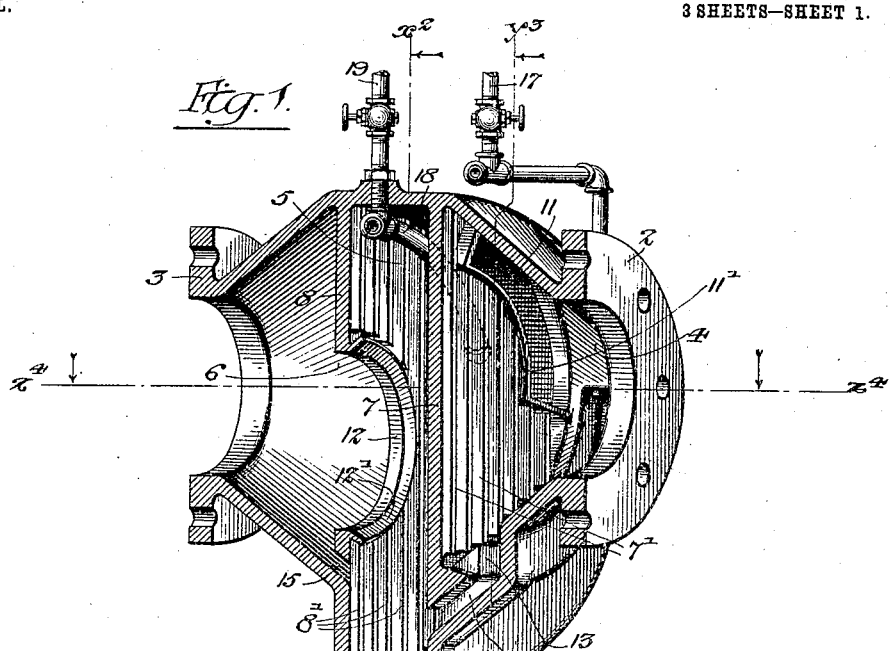
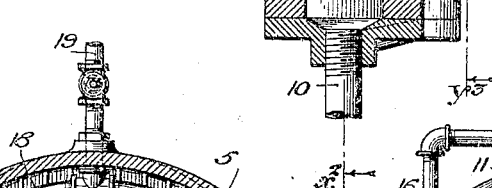
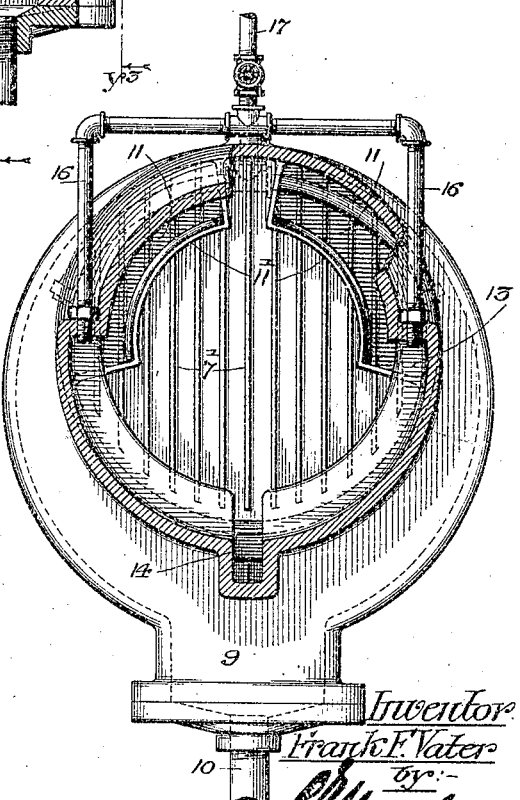

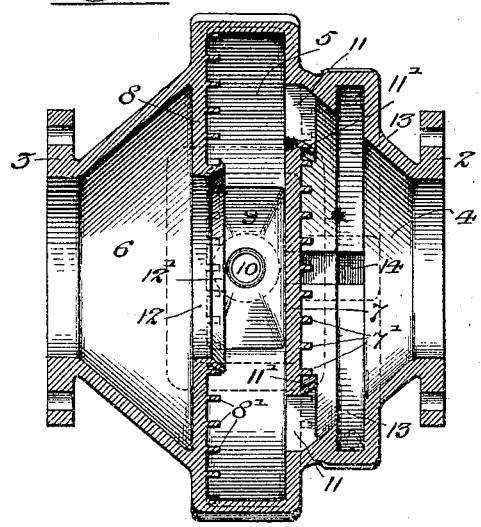
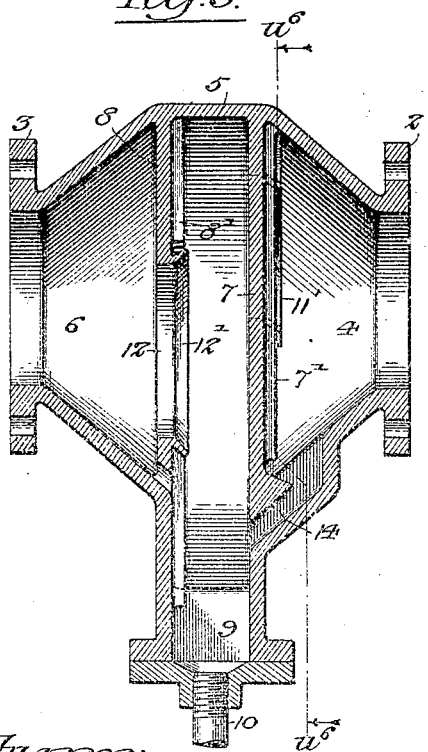
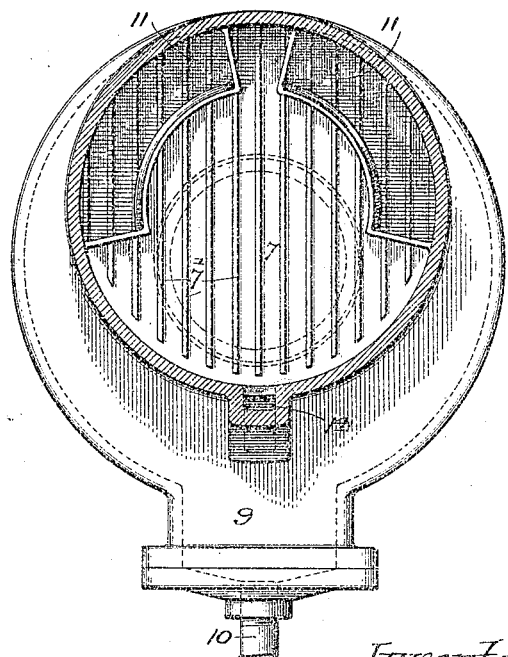

No. 773,830. PATENTED NOV. 1, 1904.
F. F. VATER.
SEPARATOR.
APPLICATION FILED FEB. 29, 1904.
NO MODEL. 3 SHEETS—SHEET 3.

Witnesses:

Inventor:
Frank F. Vater
by:—
Atty.

No. 773,830. Patented November 1, 1904.

UNITED STATES PATENT OFFICE.

FRANK F. VATER, OF CHICAGO, ILLINOIS.

SEPARATOR.

SPECIFICATION forming part of Letters Patent No. 773,830, dated November 1, 1904.

Application filed February 29, 1904. Serial No. 195,848. (No model.)

*To all whom it may concern:*

Be it known that I, FRANK F. VATER, of the city of Chicago, county of Cook, and State of Illinois, have invented a certain new, useful, and Improved Separator, of which the following is a specification.

My invention relates to steam-separators, and has special reference to separators of the impact type for removing water, oil, or solids from steam, vapor, or gas during its movement toward the point of use.

The object of my invention is to provide a separator of greater efficiency than others and which shall be of low cost, strong, simple, and compact.

Engineers recognize the fact that a steam-separator of the ordinary type—a hollow vessel containing a baffle-plate—does not effectually relieve moving steam from contained liquids or solids and that masses or quantities thereof are carried past or over the baffle-plate. All substances that escape the baffle or collector are drawn into the engine or condenser, producing therein the objectionable results that a separator is supposed to prevent. Having observed the failure of many separators in this respect, the chief object of my invention is to provide means for effectually depriving steam, gas, and vapors of substantially all contained free moisture and solids and diverting them into a suitable collecting pocket or well.

A further and particular object of my invention is to go beyond ordinary accepted methods of separation and provide a device wherein two distinct precipitations shall be accomplished during the passage of the gas or vapor therethrough, whereby the quantity of liquid now suffered to escape through a separator will be caught and diverted along with the quantity removed by the first separating action.

Still another object of the invention is to provide a steam-separator that shall be of much greater capacity than ordinary separators and yet be of no more weight and occupy little, if any, more space.

It is well known that steam or gas moving at a given velocity will hold in suspension and carry greater quantities of liquids or solids than steam moving at less velocity and that if the velocity of a moving body of moisture or oil laden steam is interrupted or diminished the greater portion of the liquid held therein will immediately be precipitated. In carrying out my invention I make use of this fact; and, stated generally, my invention consists in a steam-separator comprising entry and exit chambers and an interposed decreased-velocity chamber, suitable baffle-plates being placed between said chambers or cavities and provided with ports whereby steam entering the first chamber is made to impinge upon the first baffle and deposit part of its moisture or oil thereon and then passing through the ports or openings belonging to the first partition will have its speed checked by expansion in the intermediate chamber and be caused to precipitate the remainder of its moisture upon the second baffle, the steam or gas passing from the intermediate chamber into the exit-chamber substantially free from objectionable moisture, oil, or solids.

From the foregoing it will be seen that my invention may be aptly described as a two-stage steam-separator, inasmuch as two baffle-plates are opposed to the passage of the steam, and particularly because the steam or other vapor will always impinge upon said plates with differing velocities. In other words, in it the steam acts at two stages or velocities and is readily robbed of contained liquid.

My invention consists, further, in particular constructions and in combinations of parts, all as hereinafter described, and particularly pointed out in the claims.

The invention will be more readily understood by the accompanying drawings, forming a part of this specification, and in which—

Figure 9:
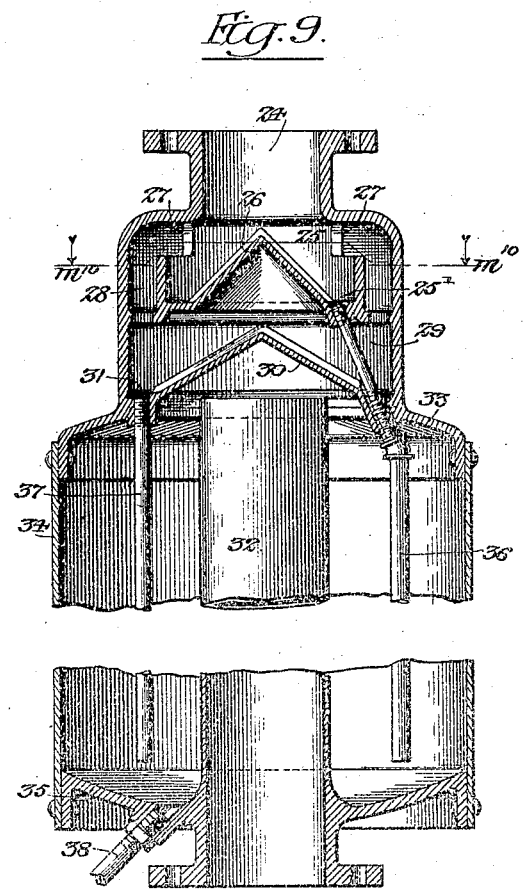
Figure 8:
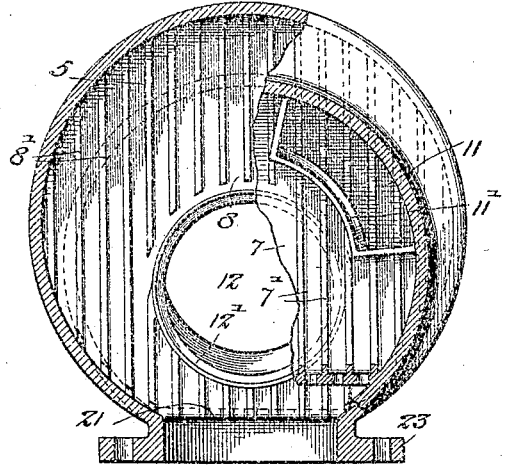
Figure 10:
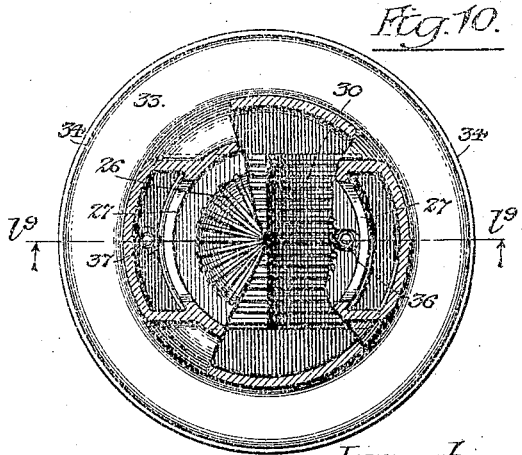

Figure 1 is a sectional perspective view of a steam and oil separator embodying my invention. Fig. 2 is a sectional view substantially on the line $x^2\ x^2$ of Fig. 1. Fig. 3 is a similar section substantially on the line $y^3\ y^3$ of Fig. 1. Fig. 4 is a horizontal section on the plane on the line $z^4\ z^4$ of Fig. 1. Fig. 5 illustrates a separator for steam at atmospheric or low pressure. Fig. 6 is a sectional view on the line $u^6\ u^6$ of Fig. 5. Fig. 7 is a vertical longitudinal section of a steam and water separator for use in high-pressure systems. Fig. 8 is a sectional view substantially on the line $v^8 v^8$ of Fig. 7. Fig. 9 is a vertical section of a vertical type of my two-stage separator adapted for use where the flow of steam or gas is downward, the view being on the line $l^9 l^9$ of Fig. 10. Fig. 10 is a horizontal section substantially on the line $m^{10}$ of Fig. 9, a portion of the first baffle-plate being broken away to disclose the second baffle-plate.

The shape of the body of my separator is determined by the use to be made of the separator. If it is to be used in a high-pressure system with pressures attaining several hundred pounds, it is substantially spherical in form, as illustrated in Fig. 7, while where it is intended for employment in a vacuum system its shape is characterized straight "sections," as illustrated in Figs. 1 and 5. The separator illustrated in Fig. 1 is adapted for separating oil from steam under vacuum, while the separator of Fig. 5 is adapted for separating water from steam at atmospheric or small pressures.

My separator in all of its forms operates upon the impact principle, coupled with that of deflecting the steam-current at a sharp angle to cause condensation and precipitation of moisture or oil.

The vacuum steam and oil separator of Figs. 1 to 4, inclusive, is preferably complete in a single hollow casting having flanges 2 and 3 at its inlet and outlet ends. 4 represents the inlet-chamber of the separator, 5 the intermediate reduced-velocity chamber, and 6 the outlet-chamber. The chambers are defined and separated by partitions or baffle-plates 7 and 8. The chambers 4 and 6 may be of the same dimensions, and the inlet and outlet openings in the flanges 2 and 3 are likewise preferably the same. Both chambers 4 and 6 are preferably circular in cross-section. The intermediate chamber 5 is also preferably circular in cross-section (see Figs. 2 and 3) and is of much greater diameter than the inlet and outlet chambers. The bottom of the intermediate chamber is provided with a well or pocket 9, to which a drain-pipe 10 is connected. The face or sides of the partitions 7 and 8 are ribbed toward the moving current of steam—that is, steam admitted at the opening in flange 2 drives or impinges against a ribbed surface upon the first partition and then passing into the intermediate chamber projects or impinges against another ribbed surface. 7' represent the ribs of the first baffle-plate or partition, and 8' the ribs of the second partition. These are preferably parallel vertical ribs formed in the casting. The steam ports or passages 11 and 12 of the two partitions are staggered with relation to one another, so that there is no direct passage for the steam through the separator, it being compelled instead to take a tortuous course therethrough. The diameter of the intermediate chamber is such that the area of the second plate is substantially twice that of the first plate, and the longitudinal dimension of the second chamber is such that its capacity is substantially twice that of the inlet-chamber. I prefer that the ports 11 shall be segmental in form and that they shall be near the top of the baffle-plate 7. The port 12 is preferably a circular opening substantially in the center of the end wall of the intermediate chamber, as shown in Fig. 2. All ports are surrounded by ribs 11' and 12', preferably backwardly inclined, to resist the forcing of the liquids through the ports. These ribs are preferably higher than the other ribs upon the baffle-plates. The combined area of the ports in the first baffle-plate preferably equals that of the separator-inlet, and the area of the port 12 is preferably slightly greater than that of ports 11 to avoid detrimental acceleration of the velocity of the steam leaving the intermediate chamber. The lower part of the inlet-chamber 4 is preferably provided with an oil-collecting groove or trough 13, that is connected with the wall or pocket 7 by a short inclined duct 14 of sufficient capacity to carry away the oil and moisture that is gathered upon the front of the first baffle-plate 7. No such oil-collecting duct is required in the intermediate chamber, as the pocket is directly at the bottom thereof. A long narrow duct 15 is preferably arranged beneath the port 12, connecting the intermediate and outlet chambers for the purpose of draining the latter in case any liquid is carried into it or enters the chamber from the exit-pipe. To prevent the collection and gumming of the collected oil and solids in the groove 13, I provide means for washing it out as often as may be necessary. The means preferred for the purpose comprise the small valved water-pipe 17 and the branches 16, leading into the upper ends of the groove 13. When the valve is opened, water will jet into the groove and force gummy contents of the same through the duct 14 and into the pocket 9. It is not necessary to wash the surface of the first baffle-plate, because there is a sufficient deposition of water thereon from the steam to prevent the gumming of the plate; but this is seldom true of the second plate, which receives little solid water. For this reason I find that it is desirable to occasionally spray the face of the large baffle-plate, using therefor a curved perforated spray-pipe 18, fed from the valved pipe 19. It should be understood that the sprays or washers should not be in continuous use unless the separator is overloaded. If the water is permitted to flow when the separator is in use, it has the effect of condensing the steam, which is usually objectionable.

The operation of my separator thus far described is as follows: The separator is arranged or included in a steam-pipe leading to the condenser from which it is desired to exclude the oil always present in exhaust-steam. The exhaust-steam enters the chamber 4 with considerable velocity and impinges upon the face of the baffle-plate 7. This causes the greater part of the oil and water contained in the steam to be deposited upon the baffle-plate, where it is caught between the ribs 7'. There is sufficient water in the steam to wet the baffle-plate, and the oil flows readily into the collecting-groove 13 and thence into the drain-pocket 9 through the duct 14. Although the steam in impinging upon the first baffle-plate suffers a loss of velocity, it substantially regains its speed in the ports 11. At these points it enters the large chamber and by expanding therein and impinging on the baffle 8 loses velocity so suddenly that all the liquid remaining in the steam is precipitated and falls into the collecting-pocket 9. The steam takes up nearly its normal velocity in the port 12, from thence entering the exit-chamber, at the opening of which it regains its full velocity.

When dealing with steam at atmospheric or low pressures, I employ substantially the separator described above, with the exception that the trough 13 and the water-pipes may be dispensed with. (See Figs. 5 and 6.)

For separating water from steam under heavy pressure I find it desirable to slightly modify the configuration of the separator and make it as nearly as possible spherical. A strict spherical form is departed from, as shown in Figs. 7 and 8, in order to provide the enlarged intermediate chamber; but the form of said chamber is such that walls of light weight have sufficient strength, without special reinforcement. The high-pressure separator differs slightly from the others to the extent that the intermediate chamber instead of extending below the end chambers projects above the tops of the inlet and outlet chambers, and the bottoms of said chambers are preferably closed by perforated floors 20 and 21. The separator operates in the same manner as that shown in Figs. 1 and 4, and the water which is collected upon the ribbed baffle-plates drains from all three chambers into a large well 22, which hangs from the bottom flange 23 of the separator proper.

In Figs. 9 and 10 I have illustrated a separator for employment in vertical high or low pressure steam-pipes, and in this case the external appearance or configuration of the separator is entirely changed. The vertical separator may be employed in a vacuum system if plate-washing means are provided. 24 represents the inlet-opening leading into the inlet-chamber 25, the bottom of which is closed by the ribbed baffle-cone 26. The steam striking upon this cone deposits its liquids, and the latter collects in the groove or place 25' at the base of the cone. The steam escapes from the chamber 25 through the ports 27, arranged on the upper walls of the chamber 25. From their ports the steam flows through the side quarters or ducts 28 into the lower and larger chamber 29, wherein the steam momentarily loses its velocity and is projected upon the inclined baffle-plate 30, having collecting-grooves 31 at the base. The oil or water remaining in the steam that enters the chamber 29 is deposited on the baffle-plates, and the freed steam escaping from the chamber 29 at the edges of the plate 30 finds its exhaust through the vertical pipe 31. The bottom of the head, containing the parts described, is provided with a flange 33 and forms the head of the drum or well 34, having a bottom 35, preferably integral with the exit-pipe 32. 36 represents a drain-pipe leading from the groove 25' of the upper chamber and through the floor of the lower chamber to deliver the collected oil or water into the bottom of the well 34. 37 is a pipe which is preferably used for draining the groove 31 at the base of the inclined baffle-plates 30 of the lower chamber. This pipe 37 may be dispensed with and the moisture permitted to find its escape at the edges of the baffle-plate, from which it will fall directly into the well. The exit-pipe 32 preferably rises to a point close beneath the baffle-plates 30, and there can be no carrying over of water or oil into it by the swiftly-moving steam from the lower separating-chamber. 38 represents the well-drain, which is usually provided with a valve.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. A separator, of the class described, comprising entry and exit chambers and an intermediate, decreased-velocity chamber, connected by suitable ports, substantially as and for the purpose specified.

2. A separator, of the class described, comprising entry and exit chambers and an intermediate, decreased-velocity chamber, said entry and intermediate chambers having ribbed walls or baffle-plates and connected by ports, substantially as and for the purpose specified.

3. A separator, of the class described, comprising a steam-entrance chamber, provided with a baffle-plate or wall, a larger chamber having a baffle-plate or wall, and said plates or walls having suitable ports, substantially as and for the purpose specified.

4. A separator, of the class described, comprising a body containing a steam-entrance chamber, having a baffle-plate and a steam-exit port, and a second chamber of substantially twice the capacity of said entrance-chamber, having a baffle-plate of substantially twice the area of the first-mentioned plate and provided with a steam-exit port, substantially as and for the purpose specified.

5. A separator, of the class described, comprising a body containing a steam-entrance chamber having a baffle-plate and a steam-exit port, and a chamber of substantially twice the capacity of said entrance-chamber, having a baffle-plate of substantially twice the area of the first-mentioned plate and provided with a steam-exit port, and means for conducting away the liquid collected on said plates substantially as and for the purpose specified.

6. A separator, of the class described, comprising a body containing chambers of different sizes having baffles differing in size adapted to cause two distinct precipitations of liquid from steam, or the like, flowing through said chambers, substantially as described.

7. A separator, of the class described, comprising a body having inlet and outlet openings, and between said openings divided into three chambers by plates containing ports, the middle chamber being of greater cubical capacity than the others, substantially as and for the purpose specified.

8. A separator, of the class described, comprising chambers of different diameters and cubical capacities, connected by suitable ports, for the flow of vapor or gas therethrough, a drain-pocket in the larger chamber, and the smaller chamber being connected with the lower part of the larger chamber, substantially as described.

9. A separator, of the class described, provided with inlet and outlet chambers separated by an intermediate chamber of greater capacity, the walls between said chambers having suitable ports, substantially as described.

10. A separator, of the class described, in which a moving stream of gas or vapor is twice changed in velocity and then restored to normal velocity, substantially as described.

11. A separator, of the class described, in which a moving stream of gas or vapor is twice changed in velocity and then restored to normal velocity, said separator having a suitable drain pocket or wall, substantially as described.

12. A separator, of the class described, in which a moving liquid-laden stream of gas or vapor is twice changed in and restored to normal velocity, said separator having a suitable drain pocket or wall, and means for wetting the liquid-collecting areas of the separator, at will, substantially as described.

13. A separator, of the class described, comprising a body containing an inlet-chamber and a larger chamber, said chambers having baffle-plates differing in size and provided with ports, a middle collecting groove or duct in the smaller chamber, and a pocket or drain connected with the larger chamber, substantially as described.

14. A separator, of the class described, comprising a body containing an inlet-chamber and a larger chamber, said chambers having baffle-plates, differing in size and provided with ports, a liquid-collecting groove in the smaller chamber, a pocket or drain connected with the larger chamber, and means for supplying water to said groove, substantially as described.

15. A separator, of the class described, comprising a body containing a large and a small chamber, an inlet connection for the small chamber, said large chamber having ports in its ends, and means for spraying the inner wall of the large chamber, substantially as described.

16. In a separator of the class described, a body containing entrance and exit chambers, and a larger intermediate chamber the walls whereof serve as baffle-plates and are provided with ports, in combination with a well or pocket depending from said body to receive the liquid caught upon said baffle-plates, substantially as described.

17. A separator, comprising a body having partitions, 7 and 8, provided with ports and dividing the body into one large and two small chambers, said partitions being provided with liquid-ducts at the bottoms of the small chambers, substantially as described.

18. A separator, of the class described, comprising a large chamber and a small chamber, arranged end to end, with a common wall, connected by staggered ports and suitably drained, whereby vapor or gas admitted at the small chamber is twice changed in velocity before it is discharged from the large chamber, substantially as described.

In testimony whereof I have hereunto set my hand, this 20th day of February, A. D. 1904, at Chicago, Illinois, in the presence of two witnesses.

FRANK F. VATER.

Witnesses:
C. G. HAWLEY,
JOHN R. LEFEVRE.